Oct. 28, 1969     W. E. METZGER, JR     3,474,525
METHOD FOR MAKING ROLLING MILL HANDLING MECHANISM CAMS
Original Filed Dec. 20, 1965     8 Sheets-Sheet 1
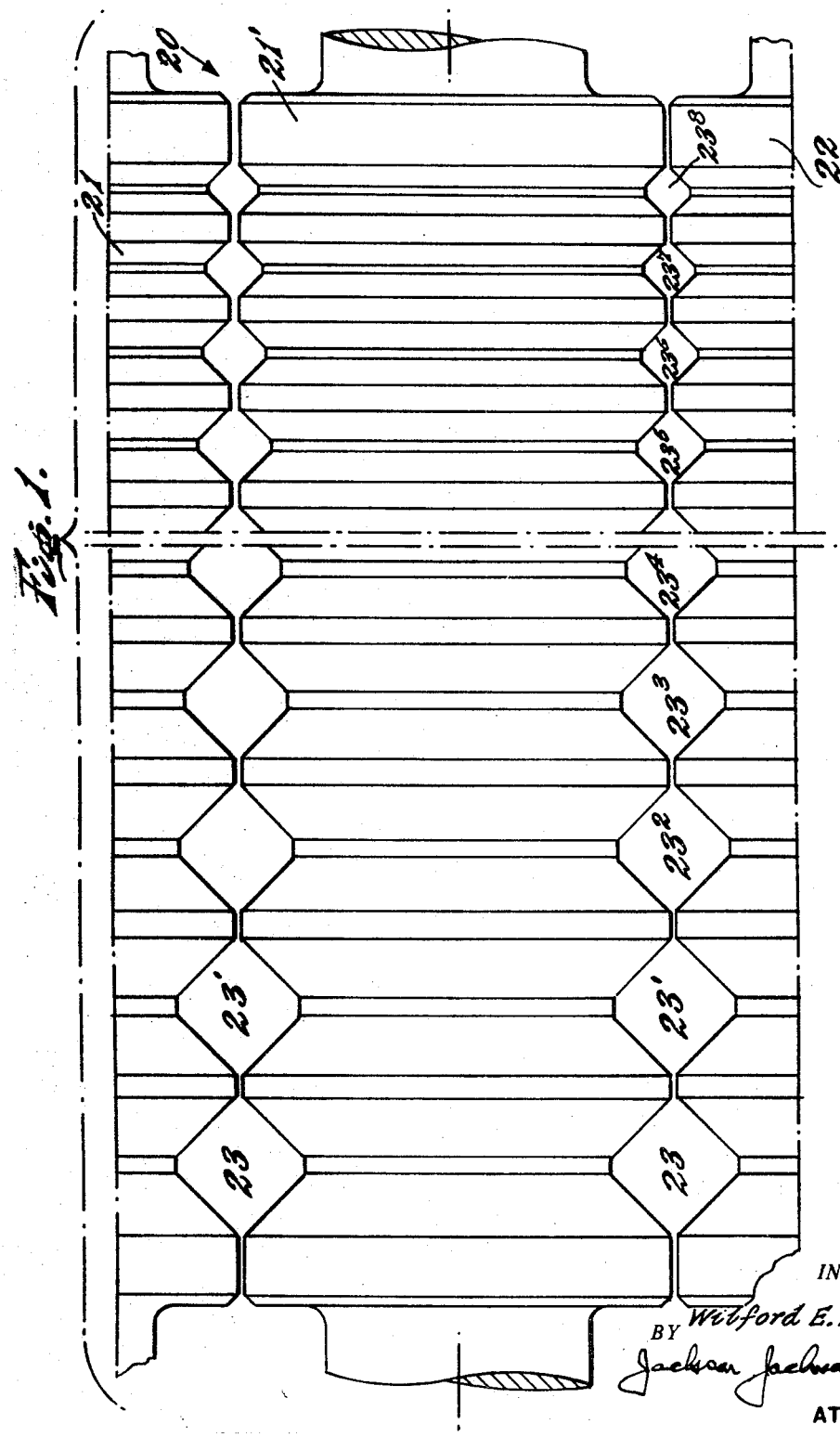
INVENTOR.
BY *Wilford E. Metzger, Jr.*
ATTORNEYS Oct. 28, 1969   W. E. METZGER, JR   3,474,525
METHOD FOR MAKING ROLLING MILL HANDLING MECHANISM CAMS
Original Filed Dec. 20, 1965   8 Sheets-Sheet 2
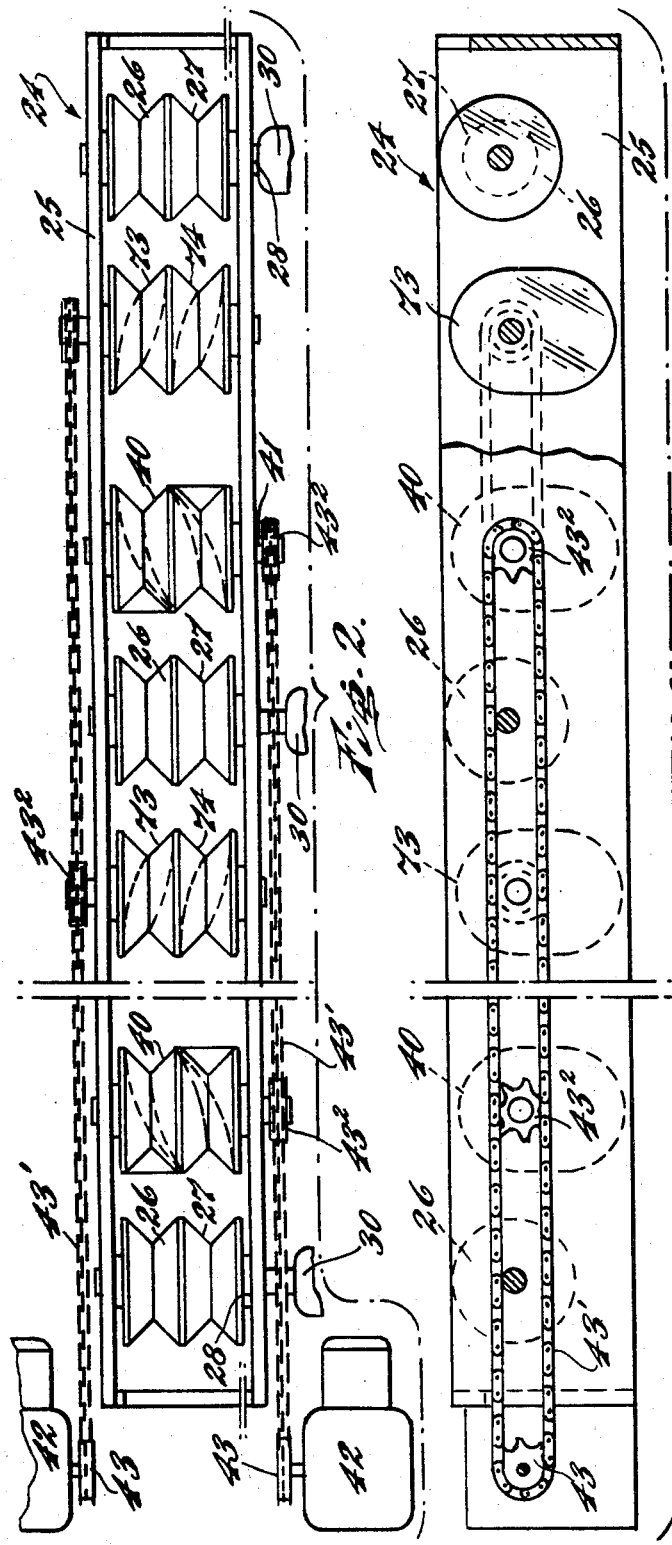
INVENTOR.
Wilford E. Metzger, Jr.
BY
ATTORNEYS Oct. 28, 1969     W. E. METZGER, JR     3,474,525

METHOD FOR MAKING ROLLING MILL HANDLING MECHANISM CAMS

Original Filed Dec. 20, 1965     8 Sheets-Sheet 3

INVENTOR.
Wilford E. Metzger, Jr.

BY

ATTORNEYS

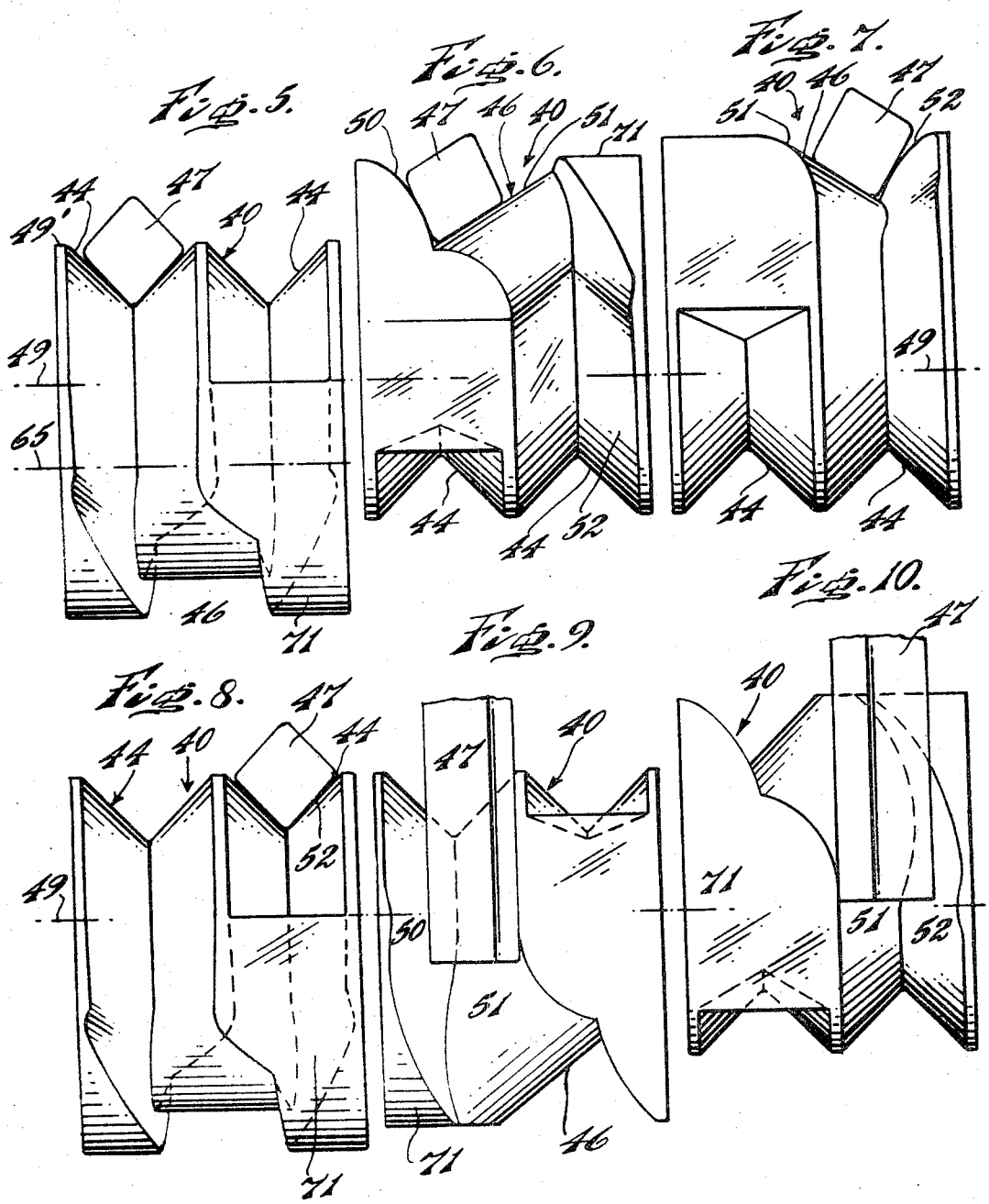

Oct. 28, 1969     W. E. METZGER, JR     3,474,525
METHOD FOR MAKING ROLLING MILL HANDLING MECHANISM CAMS
Original Filed Dec. 20, 1965     8 Sheets-Sheet 5
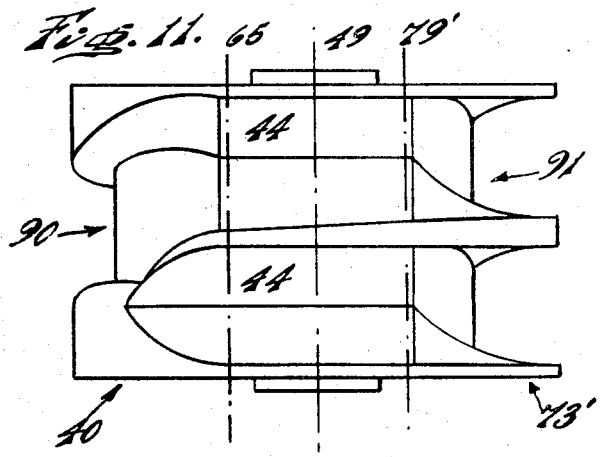
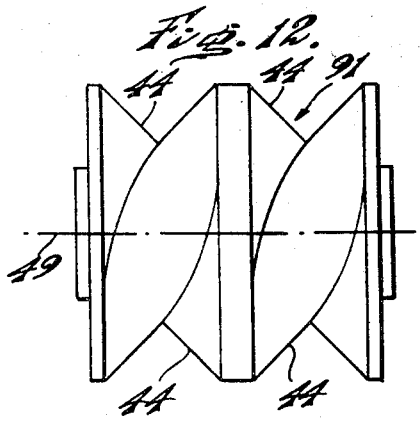
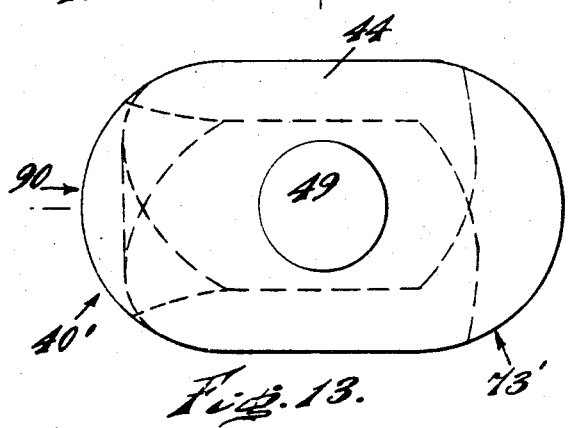
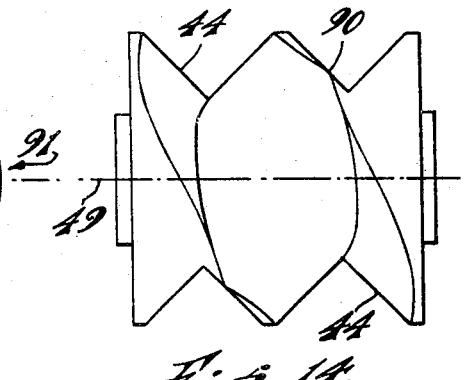
INVENTOR.
Wilford E. Metzger, Jr.
BY
ATTORNEYS Oct. 28, 1969  W. E. METZGER, JR  3,474,525
METHOD FOR MAKING ROLLING MILL HANDLING MECHANISM CAMS
Original Filed Dec. 20, 1965  8 Sheets-Sheet 6
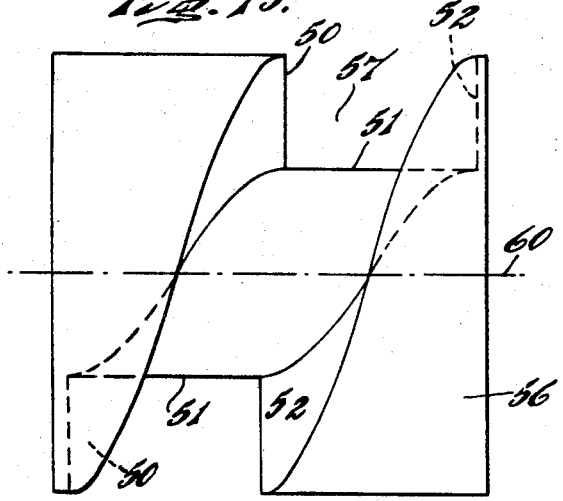
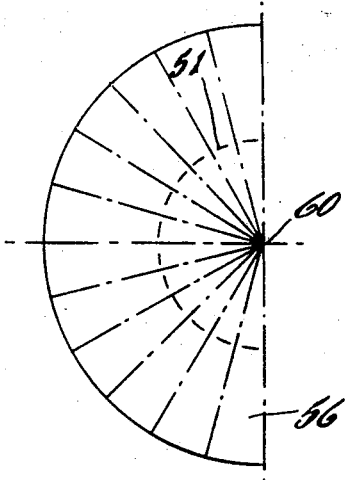
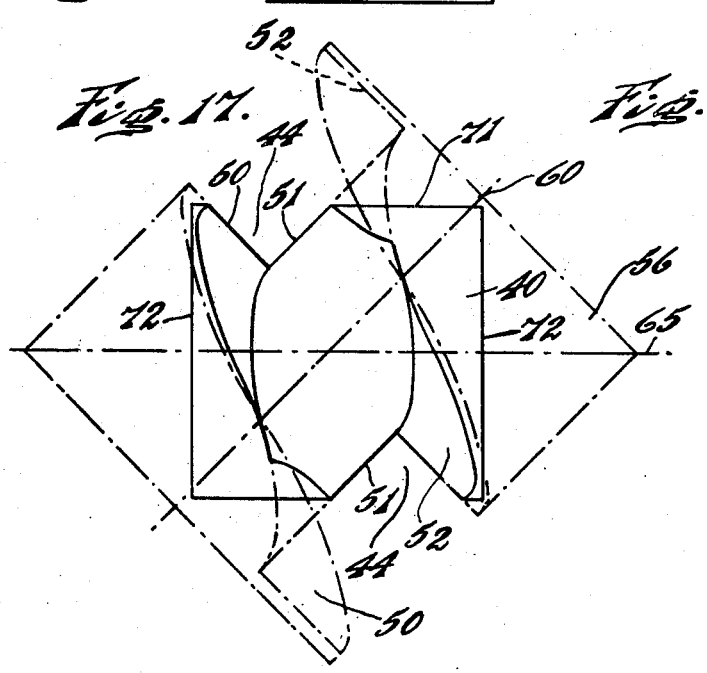
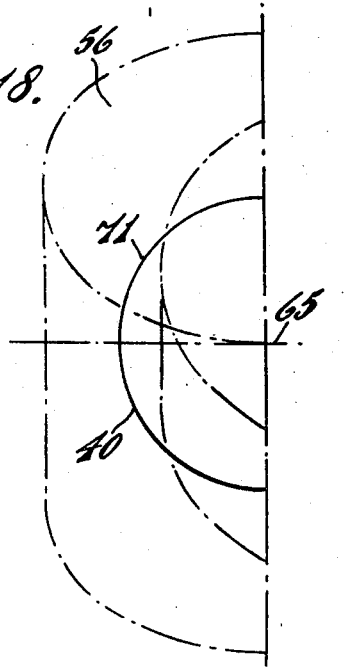
INVENTOR.
Wilford E. Metzger, Jr.
BY
ATTORNEYS

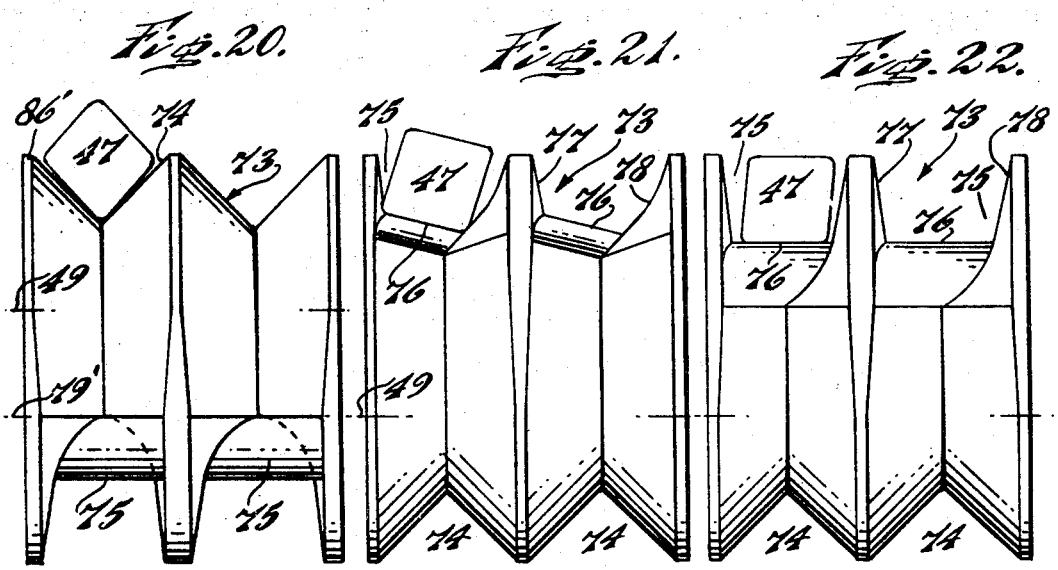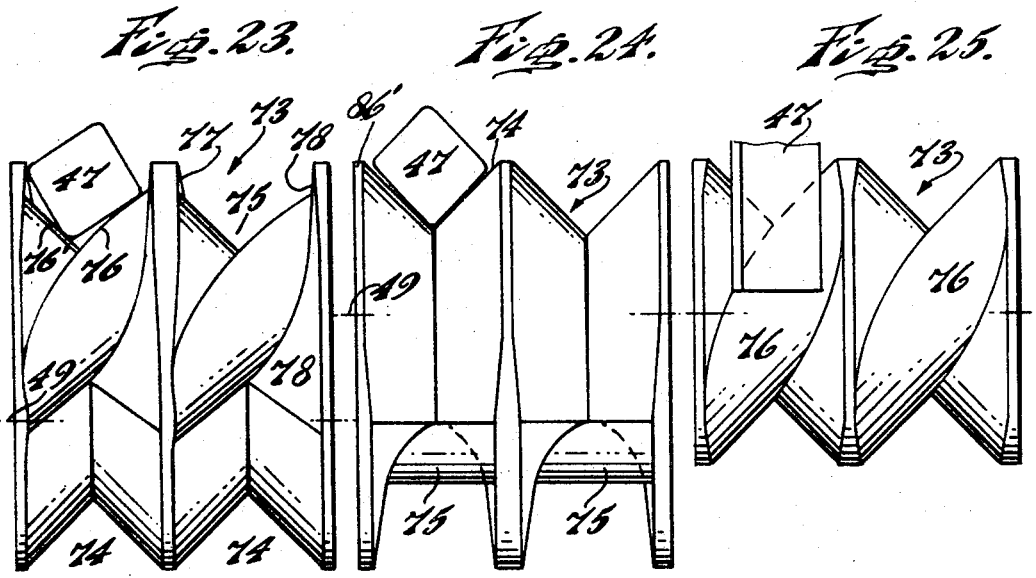

Oct. 28, 1969 W. E. METZGER, JR 3,474,525
METHOD FOR MAKING ROLLING MILL HANDLING MECHANISM CAMS
Original Filed Dec. 20, 1965 8 Sheets-Sheet 8

INVENTOR.
Wilford E. Metzger, Jr.
BY
Jackson Jackson and Brown
ATTORNEYS

United States Patent Office 3,474,525
Patented Oct. 28, 1969

3,474,525
METHOD FOR MAKING ROLLING MILL HANDLING MECHANISM CAMS
Wilford E. Metzger, Jr., Canton, Ohio, assignor to Birdsboro Corporation, Birdsboro, Pa., a corporation of Pennsylvania
Original application Dec. 20, 1965, Ser. No. 515,003, now Patent No. 3,354,684, dated Nov. 28, 1967. Divided and this application Sept. 18, 1967, Ser. No. 668,346
Int. Cl. B23p 13/04
U.S. Cl. 29—558  2 Claims

ABSTRACT OF THE DISCLOSURE

In rolling mill operations, it is necessary to handle and turn stock of rectangular cross-section between mill passes. The present disclosure deals with a mechanism for effecting such handling and turning, and specifically deals with methods of generating transfer cams and cam rollers used in the mechanism.

---

This is a division of application Ser. No. 515,003 filed Dec. 20, 1965, now Patent No. 3,354,684.

The present invention relates to rolling mill equipment of the character which is useful for handling and turning stock of rectangular cross-section between mill passes.

When rectangular stock is referred to it is intended to mean stock which is square, rectangular, or of a parallelogram cross-section.

A purpose of the invention is to avoid the necessity for shifting special turning cams laterally of a rolling mill table.

A further purpose is to mechanize the process of open square rolling on a multiple pass rolling mill.

A further purpose is to rotate a billet mechanically on a rolling mill table and support it in grooves on the table in such a manner that the billet can be progressed immediately in either direction on the same table grooves or in adjacent or adjoining table grooves.

A further purpose is to permit transferring a billet laterally over any desired intervening table grooves and turning the billet so that it can be made available at any desired lateral position of a multiple pass rolling mill for introduction into the next pass or transfer from the table.

A further purpose is to make turnover cams and transfer turnover cams compatible with a rolling mill table so that they can be interspersed with grooved table rollers and in one position will have cooperating grooves which will avoid interference with the stock as it is handled on the table rollers.

A further purpose is to provide braking surfaces on rolling mill cams so that during turning or turning and lateral transfer drag braking action is applied to the stock.

A further purpose is to avoid the necessity for resetting cam rollers and to make them effective immediately by operation in either direction.

A further purpose is to avoid the need for a shifting carriage in connection with the use of cam rollers for turning or turning and laterally transferring stock.

A further purpose is to avoid the necessity for an auxiliary guide or abutment for turning of stock.

A further purpose is to provide control of the work position in a multipass rolling mill.

A further purpose is to permit mechanical handling of a wide variety of lengths of stock on a multipass rolling mill.

A further purpose is to permit mechanical handling of stock anywhere on the table of a multipass rolling mill.

A further purpose is to permit running a billet back through a pass too large to reduce it, in order to make the next rolling pass in the same direction as the preceding pass, and gain the advantage of conducting all of the rolling in the same direction.

A further purpose is to accomplish the entire turning action or turning and lateral transfer action by cam rollers within not more than 180° of rotation so as to avoid the need for excessive billet length in order to turn it or to laterally transfer it and turn it, thus economizing on stock and permitting the rolling of shorter billets.

A further purpose is to combine in one roller a transfer turning cam and a within-the-pass turning cam, with intervening sides of the cam roller which can remain in inactive position.

A further purpose is to permit use on the same cam roller of two transfer turning cams in different circumferential positions or two within-the-pass turning cams in different circumferential positions.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a fragmentary front elevation of a three-high nonreversing rolling mill which may be employed in connection with the invention.

FIGURE 2 is a fragmentary top plan view of a mill table of the invention for use in connection with a rolling mill of the type shown in FIGURE 1.

FIGURE 3 is a fragmentary side elevation of the mill table of FIGURE 2.

FIGURE 4 is a perspective of one form of transfer turning cam according to the invention.

FIGURES 5 to 8 are side elevations of the transfer turning cam of FIGURE 4 illustrated in different angular positions, showing action upon a bar resting on the transfer turning cam.

FIGURE 9 is a fragmentary top plan view of the cam and bar of FIGURE 6.

FIGURE 10 is a fragmentary top plan view of the cam and bar of FIGURE 7.

FIGURES 11 to 14 illustrate a modified form of within-the-pass turning cam and transfer turning cam.

FIGURE 11 is a top plan view of the modified cam.

FIGURE 12 is a right side elevation of the modified cam of FIGURE 11.

FIGURE 13 is an end elevation of the modified cam of FIGURES 11 and 12.

FIGURE 14 is a left side elevation of the modified cam as shown in FIGURES 11 to 13.

FIGURES 15 to 18 show the generation of the transfer turning cam of FIGURES 4 to 10.

FIGURE 15 shows the cutting of the helical thread as the blank is turned on the helix axis viewed in side elevation.

FIGURE 16 is a half end elevation of FIGURE 15.

FIGURE 17 is a side elevation showing the shifting of the axis to establish the cam roller axis for the cam of FIGURES 15 and 16 at 45° with respect to the helix axis, and illustrating the cutting off of the ends and the turning of the half circumference of the cam roller.

FIGURE 18 is a half end elevation of the cam as shown in FIGURE 17.

FIGURE 19 is a perspective showing a within-the-pass turning cam according to the invention.

FIGURES 20 to 24 are side elevations of the within-the-pass turning cam of FIGURE 19 illustrated in progressively different positions and shown in the process of turning a bar.

FIGURE 25 is a fragmentary top plan view of the within-the-pass turning cam shown in FIGURE 22.

FIGURE 26 shows the rotation of the blank on its helix axis for cutting the helical thread.

FIGURE 27 is a half end elevation of FIGURE 26.

FIGURE 28 shows the shifting of the blank of FIGURES 26 and 27 from the helix axis to the cam roller axis, through an angle of 45°, for cutting the exterior circumference of the within-the-pass turning cam and also for cutting off the ends.

FIGURE 29 is a half end elevation of FIGURE 28.

Figure 26:
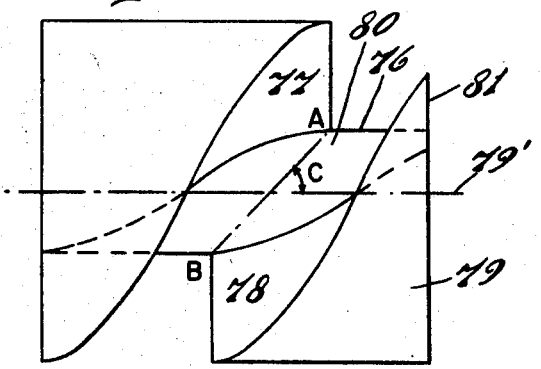
FIGURES 26 to 29 are views showing generation of the within-the-pass turning cam.
Figure 27:
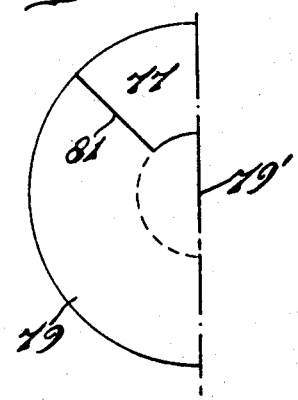

In the prior art multipass rolling mills for rolling bars, rods, and shapes, are commonly employed. In some cases the passes are distributed laterally between rolls of a two-high mill and in other cases they are provided in a three-high mill. The stock is handled on a rolling mill table which may be vertically stationary, or which may be a tilting table or elevating table in the case of a three-high mill.

It is necessary, in order to obtain the reduction required, to conduct successive rolling passes with the stock turned or rotated about its longitudinal axis so that the major squeezing of the next mill pass is at right angles to that of the preceding mill pass. This is known by various names in the art, such as "open square" rolling and rolling "diamond to square."

On the mill table which cooperates with such a multipass rolling mill, table rollers are provided each having a plurality of trough-like grooves, one set in line with each rolling mill pass. Thus when the stock comes through a particular pass on to the mill table, it is received in a particular set of table roller grooves and held in the correct relation around its longitudinal axis by the walls of the grooves.

The problem then arises of turning the stock approximately 90° about its longitudinal axis and shifting it laterally into another set of grooves which are in line with the next mill pass into which the stock is to be fed. This has been solved initially by workmen who have manually turned the stock and transferred it to the correct set of table grooves in line with the next mill pass. Automatic turning and transfer equipment has also been developed, as shown in U.S. Patent No. 2,839,956 to Edward C. Peterson.

In U.S. Patent No. 1,217,919 to Coryell a rolling mill table is provided having smooth table rollers with a laterally movable set of cam rollers which are capable of turning the stock and aligning it with the next mill pass. This mechanism, however, requires special skill by the operator in moving the cams to the correct lateral position to be effective, and requires also that the mill table be provided with a shifting carriage to bring the cams to the correct position. These devices also require resetting to make them effective for the next operation. In some cases an auxiliary guide is required to engage the stock.

In order to work effectively on a table of this kind, the stock must be relatively long, since complete rotation of the cams is required to accomplish the turning.

The present invention is concerned with an improved device for turning the stock within the same mill pass alignment or for turning it and depositing it in line with the next or a subsequent rolling mill pass.

Unlike some of the prior art devices, the mechanism of the invention cooperates with a usual type of rolling mill table having grooved rollers provided with a groove aligned with each mill pass.

Unlike the prior art devices, no shifting carriage is required, no auxiliary guide or abutment is employed, and no resetting of cams is necessary in some forms.

Interspersed among the grooved table rollers are provided two or more turning rollers or transfer and turning rollers, which in inactive position have grooves compatible with the grooves in the table rollers and not providing any interference with stock motion.

Once the cam rollers are operated, they first pick up the stock and raise it above the table rollers and at the same time turn the stock suitably through 90°, and in one form deposit the stock in an adjacent set of table roller grooves for the next pass.

One of the great advantages of one form of the cam rollers of the invention is that they accomplish these functions within not in excess of 180° of their circumference, leaving additional circumferential length which can be utilized for other purposes.

One advantageous feature is that as the cam rollers raise the stock above the table rollers they can apply a drag braking effect to the stock which will slow the forward progression of the stock. This aids in the manipulation of stock of short length.

In the preferred embodiment of the invention, the cam rollers repeat across the table so that there is an effective set of cam rollers available at each groove position of the table rollers, and stock can be turned or turned and transferred anywhere on the mill table.

The present invention provides much closer control of working position than prior art devices since at any position of the stock it is possible to turn it mechanically through 90° and also if desired to move it mechanically to an adjoining groove or successively to adjoining grooves.

While the invention is believed to find its widest application in open square rolling, it may be employed in other types of rolling, including box pass rolling.

In one embodiment of the invention, the cam rollers of the present invention which are interspersed among the grooved table rollers are of two types. One set of cam rollers turns the stock while retaining it in its same lateral position in the grooves of the table rollers.

Another set of cam rollers turns the stock and at the same time transfers the stock to an adjoining lateral position, which may be the next lateral position or one somewhat further removed from the initial position.

In any case the stock is supported in both its initial and its final position disposed upwardly at about 45° from the position which it would assume at rest on a flat surface.

It will be understood, of course, that the billet cross-section need not be exactly square or exactly rectangular, even though the type of work is called open square rolling. This contemplates, of course, the possibility that the corner of the cross-section may be somewhat more or somewhat less than a right angle.

The cam rollers of the present invention may conveniently be visualized as combinations of cams and rollers which are capable of performing the following functions:

(1) Remaining with their cylindrical surface on a line with the cylindrical surface of the table rollers and with grooves which are just below the grooves in the table rollers so as not to interfere or to exert a minimum of interference with stock being fed longitudinally through the grooves of the table rollers. This position is possible because the cam when viewed from the end is not circular but may be regarded as elliptical or bulbous.

(2) By rotating the cam, the stock is raised above the table rollers so that it can be turned without interference with the grooves of the table rollers and it is held above the table rollers as long as it is undergoing turning or transfer, or both.

(3) While the stock is raised above the table rollers, it is turned about its longitudinal axis approvimately 90°.

(4) In some of the cams the stock is also transferred laterally while it is being turned.

(5) All of this action may take place in less than 180° of the cam circumference in the preferred embodiment.

(6) The cam circumference in the preferred embodiment provides a braking surface and this is made most effective by moving the cam slowly with respect to the motion of the stock.

The mill table of this invention may be a stationary table, a lifting table, a tilting table or any other suitable mill table.

In some cases the procedure for handling the stock on the mill table differs from prior practice. In some cases after rolling in a smaller pass, the stock is turned and transferred laterally to a larger pass and fed back through this larger pass to the opposite mill table and then progressed for rolling in a smaller pass. This achieves the advantage of always rolling by progressing the bar, after turning, in the same longitudinal direction, and thus producing a superior metallurgical structure.

One of the advantages of the present invention is that the generation of cam rollers is greatly simplified by a technique to be described, in which the cam rollers are first turned on a helix axis and a helical thread is then cut in the outside, the thread having a square configuration. Then the axis is shifted 45° in the plane of the paper, and the cam blank is rotated on a new axis corresponding to its axis of rotation. On the new axis a part of the surface having the half helix is formed into a half cylinder, cutting off one side of the square thread at each end of the cam and a portion of the thread bottom in some cases as later described, and the ends are cut off at right angles to the axis of rotation. It will, of course, be evident that if several different cams are being fabricated on the same rollers, this procedure will be followed along the length of the roller or the roller may be assembled by mounting several separate cams on the same shaft.

It will, of course, be understood that the cams must turn in synchromisn in order to achieve good results.

In a rolling mill having a mill table of the invention, a typical speed of progression of the stock will be 300 ft. per minute or greater. The cam rollers of the invention can transfer the stock from pass to pass and turn it in less than a half second. If the table lifts, the time required to take the stock from one pass and feed it to the next pass with turning and transfer need not exceed 5 seconds and if the table does not lift, this can be done in not exceeding 3 seconds.

While it will be evident that idler rollers can be used, it will be decidedly preferable to drive all of the table rollers selectively in either direction and at the same speed. Likewise, the motion of the cam rollers in either direction is synchronized by separate drive.

In the case of the cam rollers, one way of accomplishing the drive is by the well known reversing electric motors which include internal braking and drive in synchronism through a single rotation in either direction and then stop. This avoids the necessity of resetting the cam rollers.

In FIGURE 1, I show a three-high rolling mill having mill stands 20 (only one of which is shown) provided with upper, middle and lower mill rolls 21, 21′ and 22 having a succession of passes 23, etc. as illustrated, normally starting with a large pass 23 and proceeding to smaller passes 23′ to 23⁸, with omission of intermediate passes to suggest that there may be many more.

Mill tables cooperate with the rolling mill on opposite sides. For this purpose, in FIGURES 2 and 3, I illustrate a single mill table 24 having a frame 25. The mill table is broken to suggest that it is of great lateral extent, as wide as the rolling mill, but other parts are omitted to simplify the drawing. It is also broken to suggest great length. Normal table rollers 26 have a series of V-shaped grooves 27, mounted in sets, in line with one of the mill passes, and the rollers extend the full width of the rolling mill so that there is a set of trough-like grooves corresponding to each pass.

The table rollers are mounted on bearings 28 and driven reversibly at the same speed in either direction by individual motor drives 30 as well known.

Interspersed among the table rollers are a series of transfer cam rollers 40 mounted on bearings 41 driven individually or as a group in synchronism in either direction by motor and speed reducer 42 of the well known type which go through a single rotation and then stop. The motor and speed reducer 42 may drive through sprocket 43 to chain 43′ to sprocket 43² on the individual transfer cam rollers 40.

It will be evident that in the preferred embodiment it may be desirable to provide individual synchronized drives for each of the transfer cam rollers 40.

Each of the transfer cam rollers 40 has a position best shown in FIGURE 5 in which at the top it has two V grooves 44 each of which is in line with one of the preferably immediately adjacent sets of grooves 27 in the table rollers and at a level below the table rollers. Thus the grooves 44 are preferably slightly below the corresponding grooves in the table rollers. Between the two V-shaped grooves 44 is a helical transfer groove 46 which is operative in either direction of rotation and which as it turns about the axis or shaft 49 first raises the rectangular stock 47 as shown in FIGURE 5, at the same time turning it about the longitudinal axis and the stock while it is above the level of the table rollers as shown in FIGURE 6, and then restores it to the next or an adjacent groove in the table rollers turned or rotated 90° with respect to its initial position as shown in FIGURE 8. This is accomplished by engaging the stock initially at one side by a cam face 50 (FIGURE 6) which corresponds to a former side of the V-groove and at the other side with the bottom 51 of the square cut thread, and then by the helix of the square cut thread changing the position of the bottom 51 so that whereas it was on the right of the V groove at the groove inlet (FIGURE 6), it is on the left at the groove outlet (FIGURE 7), while the opposite side of the stock in its now rotated position is supported by the opposite side 52 of the square cut thread, slightly curved.

The action of the transfer cam will be better understood by considering its generation as shown in FIGURES 15 to 18. A cam blank 56 suitably of cylindrical form is provided with a square cut helical thread 57, cut into its cylindrical circumference to make a specified spiral lead in 180° as shown in FIGURE 15.

The spiral lead in 180° will change with the size of the cam roller, but must be enough so that it corresponds with the center line distance between one groove and the next on the table, or a multiple thereof. The thread has a bottom 51 parallel to the helix axis 60, a straight side 50 and an opposing straight side 52.

The blank is then swung around a new axis 65 which is achieved by swinging the blank 45° in the plane of the paper in FIGURE 15 with respect to the helix axis 60. For a left hand lead as shown in FIGURE 15 it is necessary to swing counterclockwise and conversely for a right hand lead it would be necessary to swing clockwise. A semicircumferential cut 71 is made about the new axis 65 which cuts away all of one side and approximately half of the bottom of the square helical thread over half of the circumference as shown in FIGURE 18, so that a V groove is provided as shown at 44 (FIGURE 17) at the start which has a bottom surface 51 of the spiral or helical thread on the right at one end of the semicircumference and on the left at the other end because the bottom surface 51 has intermediately reversed its slope. In between the two ends the groove ceases to be a V-groove and becomes a box section. The other surfaces 50 or 52 of the initial helical groove is one of the former side surfaces of the square cut spiral or helix at one end and the other side surface of the square cut helix at the end.

In finishing the cam or prior to cutting off the semicircumference 71 the ends are faced at 72 to remove excess material from the blank and square the ends.

Next the cam is rotated about an axis of rotation 49 which is parallel to but in FIGURE 17 below the axis of rotation 65 by a distance sufficient to lift the bar clear of the table rollers and achieve the transfer without interference with the table rollers. See FIGURE 5. The cam turned about this axis 49 is then machined at the opposite end to form a cylindrical surface 49′ (FIGURE 5) which may have the same diameter as the cylindrical surface 71 but is displaced from it. On the axis 49 over the half circumference of the surface 49′ the V-grooves 44 corresponding to the table grooves are cut but they will, of course, be depressed below the table grooves. Transition surfaces are also machined between semi-cylindrical surfaces 71 and 49′.

Thus it will be evident that during one half circumference of the cam rollers the stock, has been made to rotate or turn through 90° and also shifted laterally to a position corresponding with the next mill pass and in line with the next set of table roller grooves 27.

The remainder of the surface of the cam roller is merely an up-hill and down-hill sloping V portion.

It will be evident that the transfer cam rollers will extend clear across the mill table, there being one set for each pair or other group of mill passes. Thus the stock can be moved clear across the mill table or any desired distance by moving it by successive sets of transfer cam rollers.

Interspersed among the transfer cam rollers and the table rollers are a set of within-the-pass cam rollers 73. While these are individual for each pass they are preferably made in pairs and mounted on a single shaft so that successive cams will extend clear across the mill.

These within-the-pass turning cam rollers 73 start with a trough-like groove 74 which is below the level of the grooves in the table rollers and in line therewith as shown in FIGURE 2. The condition at this point, when the within-the-pass turning cam rollers are inoperative, is shown in FIGURE 20. When the within-the-pass turning cam rollers begin to turn, leaving the position of FIGURE 20 and moving toward the position of FIGURE 21, the former V-shaped groove 74 changes to a generally square cut helix 75 as shown in FIGURE 21, having a bottom wall 76 and side walls 77 and 78. The bottom wall 76 initially engages the bottom of the stock as the stock begins to turn in FIGURE 21 and then shifts through a horizontal position as shown in FIGURE 22 to a position in which the bottom wall 76 is inclined up to the right as shown in FIGURE 23 to turn the stock about its longitudinal axis through 90°, while a left side sloping wall 76′ is holding the opposite lower portion of the stock. In the meantime, one side wall 77 restrains the stock at one side and another side wall 78 is about to restrain the stock at the other side and eventually one of the side walls with the bottom wall generates a V as shown in FIGURE 24 to establish the V-groove 74, which holds the stock erected in its new position.

Thus as shown in FIGURES 2 and 3., the within-the-pass turning cams 73 can be driven separately but in unison but may be driven by the single rotation motor and speed reducer 42 driving sprocket 43 to operate chain 43′ and turn cams 73 by sprockets 43².

To generate the within-the-pass turning cam roller of FIGURES 19 to 25, I first rotate a suitable cylindrical blank 79 about a helix axis 79′ and cut a square cut spiral or helical thread 80 beginning at one end and running out suitably adjacent to the other end. The lead is established by constructing a line A–B as shown in FIGURE 26 joining the corner of one thread at 0° with the opposite corner of the thread at 180° and this line must establish an angle C with the axis 79′ which will be 45°. The width of the thread must be wide enough to carry the bar that will pass through it in the position of FIGURE 2. The square cut thread has a bottom surface 76, surface 77 at one side and surface 78 at the other side. Next the blank 79 is rotated about a new axis 84 determined by swinging in the plane of the paper 45° with respect to the axis 79′ in FIGURE 26. The same rule is followed that for a left hand thread you swing counterclockwise and for a right hand thread you swing clockwise as described above. While turning about the new axis 84 a semicylindrical surface 85 is cut corresponding to the approximately 180° extent of the helical thread, cutting off one side and part of the bottom of the square V thread at each end. This produces a half cylindrical exterior 85 corresponding to the curvature of the table rollers. One of the helical threads is cut corresponding to each pass. Also the end is faced at 86 although preferably for two rollers.

Figure 28:
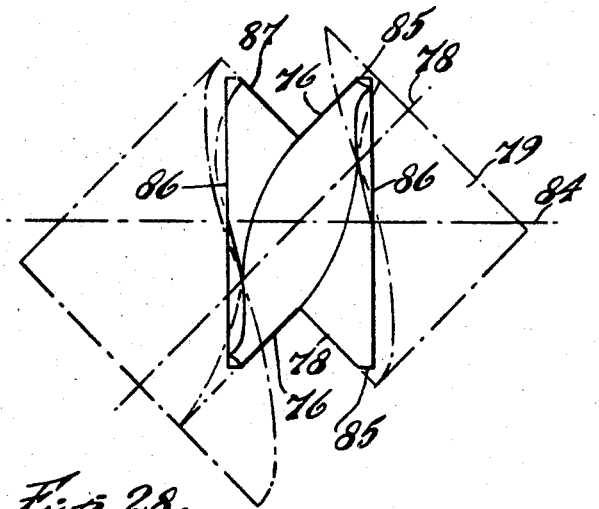
Figure 29:
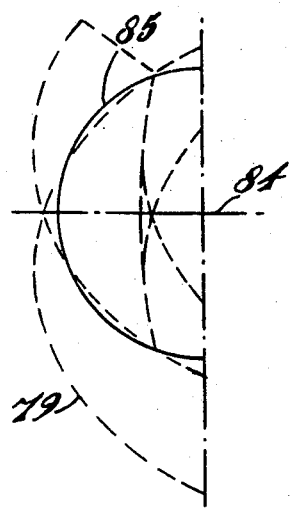

Then the cam is turned about a new axis 49 which is the final axis of rotation (FIGURE 20) which is displaced below the plane of the paper in FIGURE 28 by the desired distance to provide V-grooves 74 in line with but below the table roller grooves. Turning the cam through a semicircumference around the axis 49 the portion 86′ is cut and V-groove portions 74 are provided which are below the level of the table roller grooves.

Thus in accordance with the invention the transfer turning cams can be used at any point laterally of the table to rotate the stock through 90° and transfer it to an adjoining or adjacent pass. Or, if desired, the within-the-pass turning cams can be used to rotate the stock through 90° and restore it to the same pass. In either case the stock is properly deposited in the trough-like rollers ready for the next rolling mill operation. The cam rollers can move in either direction as required providing that the transfer is effected to the correct point.

In FIGURES 11 to 14, I illustrate a combined cam roller which has one-half of its circumference to perform the functions of a transfer cam roller and the other half to perform the functions of a within-the-pass turning cam roller. Thus to generate the transfer turning cam portion 40′, the blank was manipulated as already discussed to make this portion of the cam and turned about an axis 65, but the last step of cutting off the lower portion about axis 49 was eliminated. Then likewise the blank was set up to turn the within-the-pass turning cam 91 and when it came to turn about axis 79′ the cam was completed without machining away the lower portion about axis 49 as previously described, merely making merging paths which joined the two halves.

Between the two cams are V-portions which in FIGURE 5 were designated 44 in line with the table roller grooves. In order to operate the cam rollers of FIGURES 11 to 14 it will be understood that from any given cam position the rollers will be driven clockwise one half revolution and stopped to achieve one effect, say the transfer turning effect, and counterclockwise one-half revolution and stopped to achieve the other effect, for example the within-the pass turning effect. The rollers in each case achieve a braking effect as they raise the stock above the table rollers in the grooves. The rollers must be brought back to starting position before reuse. The drive will be the same except that it will turn one half revolution and then reverse.

It will be evident that of course the principles of FIGURES 11 to 14 can be used to make two transfer cams, one at each end of the same roller, or within-the-pass turning cams at opposite ends of the same roller. This would extend the life of the cams greatly. For this purpose, one can consider that opposite ends of the device in FIGURES 11 to 14 will be the same.

Thus in accordance with the invention the transfer turning cam rollers can be used at any point laterally of the table to rotate the stock through 90° and transfer it to an adjoining pass, or, if desired, the in-pass turning cam rollers can be used to rotate the stock through 90° and restore it to the same pass. In either case the stock is properly deposited in the trough-like rollers ready for the next rolling mill operation. The cam rollers can move in either direction as required and will perform the same function except, of course, that if lateral transfer is contemplated, the direction of rotation must be chosen to deposit the stock in the correct grooves for the next mill pass.

Unlike prior art mechanism, there is no preliminary planning required to move transfer mechanism to the correct position prior to the arrival of the stock at that position, and no auxiliary guide is to be moved laterally in anticipation of the next operation. No delay is required for resetting of the cam rollers.

The invention makes unusually close control of work position possible.

In rolling mills where material is of considerable value, as in alloy steel, no unnecessary length of billet need be used.

At the time the stock is turned it is always above or clear of the table rollers so that no damage can be done to the table rollers or the stock.

Where a certain sequence of direction of rolling is desired to be maintained in order to achieve better metallurgical properties, the invention lends itself particularly well to returning the stock through a non-rolling pass which is larger than the stock so that the next rolling pass can be accomplished in a predetermined direction. Thus in FIGURE 1, after rolling through lower pass 23² the bar can be turned on the mill table and sent back through larger upper pass 23' and then transferred laterally on the opposite mill table and again rolled through lower pass 23² or 23³ so as to roll always in the same direction.

While the invention is particularly suitable for mechanism for open square rolling, it can be used with other types of rolling such as the bax pass.

The invention furthermore greatly facilitates the generation of the cam rollers in a logical manner using convenient and readily understood methods of machining, rather than relying on profile cutting on the basis of trial and error.

In view of my invention and disclosure variations and modifications to meet individual whim or particular need will doubtless become evident to others skilled in the art, to obtain all or part of the benefits of my invention without copying the method shown, and I therefore claim all such insofar as they fall within the reasonable spirit and scope of my claims.

Having thus described my invention, what I claim as new and desire to secure by Letters Patent is:

1. A method of generating a transfer cam, which comprises turning a cam blank about a helix axis and concurrently cutting into the cam a square helical thread having a helix bottom and helix sides, and having a length of helix not exceeding 180°, then turning the cam about an axis disposed at an angle of 45° from the helix axis and cutting a semi-cylindrical exterior cam surface, removing one side wall of the thread and a portion of the bottom wall of the thread at one end of the thread and the other side wall of the thread and a portion of the bottom wall of the thread at the other end of the thread, thus forming a cam groove, the cam groove at one end consisting of one of the side walls and the bottom wall of the helical thread in trough form and the cam groove at the oither end consisting of the other side wall and the bottom wall of the helical thread in trough form, the bottom wall at one end of the groove being on the left of the groove and at the other end of the groove being on the right of the groove and reversing its slope between opposite ends of the cam groove, and cutting off the ends of the cam.

2. A method of generating a within-the-pass turning cam roller, which comprises rotating a cam blank about a helix axis and cutting a square helical thread in the cam having a bottom helix wall and two side helix walls, the thread extending not in excess of 180° of the circumference, turning the cam blank about an axis disposed at an angle of 45° to the helix axis and cutting a semi-cylindrical cam surface, removing at one end of the thread one side wall and a portion of the bottom wall of the helical thread and removing at the other end of the thread the other side wall and a portion of the bottom wall of the helical thread thus forming a cam groove, the cam groove at one end being formed of one of the side walls and a portion of the bottom wall of the helical thread and the cam groove at the other end being formed by the other side wall and a portion of the bottom wall, the bottom wall being at the left of the groove at one end of the thread and at the right end of the groove at the other end of the thread and reversing its slope between the ends, and cutting off the ends of the cam blank.

References Cited
UNITED STATES PATENTS

| | | | |
|---|---|---|---|
| 1,977,194 | 10/1934 | Malkovsky | 29—558 |
| 2,999,311 | 9/1961 | McDonald et al. | 29—558 |

JOHN F. CAMPBELL, Primary Examiner

R. J. CRAIG, Assistant Examiner

U.S. Cl. X.R.

29—557; 72—231